US008325743B2

(12) United States Patent
Shigeta et al.

(10) Patent No.: US 8,325,743 B2
(45) Date of Patent: Dec. 4, 2012

(54) RELAY APPARATUS, RELAY PROGRAM, RELAY METHOD, AND MANAGEMENT SYSTEM FOR MANAGING DEVICES CONNECTED TO NETWORK

(75) Inventors: Soichi Shigeta, Kawasaki (JP); Nobutaka Imamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 370 days.

(21) Appl. No.: 12/565,259

(22) Filed: Sep. 23, 2009

(65) Prior Publication Data

US 2010/0008374 A1    Jan. 14, 2010

Related U.S. Application Data

(63) Continuation of application No. PCT/JP2007/056906, filed on Mar. 29, 2007.

(51) Int. Cl.
*H04L 12/56* (2006.01)

(52) U.S. Cl. ............ 370/401; 370/389; 370/395.54

(58) Field of Classification Search .......... 370/255, 370/389, 395.54, 401; 340/8.1, 10.1, 572.1
See application file for complete search history.

(56) References Cited

U.S. PATENT DOCUMENTS

| 2003/0061382 A1* | 3/2003 | Brown et al. ............... 709/245 |
| 2004/0193708 A1* | 9/2004 | Matsumoto .................. 709/223 |
| 2007/0222597 A1* | 9/2007 | Tourrilhes et al. ......... 340/572.1 |
| 2008/0082664 A1* | 4/2008 | Popescu et al. .............. 709/226 |
| 2008/0114865 A1* | 5/2008 | Rothman et al. ............. 709/223 |

FOREIGN PATENT DOCUMENTS

| JP | A 2004-533139 | 10/2004 |
| JP | A 2006-121533 | 5/2006 |
| JP | A 2006-349307 | 12/2006 |
| WO | WO 02/069096 A2 | 9/2002 |

OTHER PUBLICATIONS

English Translation of the International Preliminary Report, previously submitted on Sep. 23, 2009.

* cited by examiner

*Primary Examiner* — Robert Wilson
*Assistant Examiner* — Mohamed Kamara
(74) *Attorney, Agent, or Firm* — Greer, Burns & Crain, Ltd.

(57) ABSTRACT

A relay apparatus includes: a tag information acquisition section that acquires tag information attached to the network-connected device; a management section that manages the tag information read out by the tag information acquisition section and an IP address assigned by the management apparatus, and an identification information assigned to the relay apparatus itself in association with one another; and a processing section that receives information that the management apparatus has transmitted with the tag information or IP address as a transmission destination and receives information transmitted from the network-connected device for execution of predetermined processing.

18 Claims, 13 Drawing Sheets

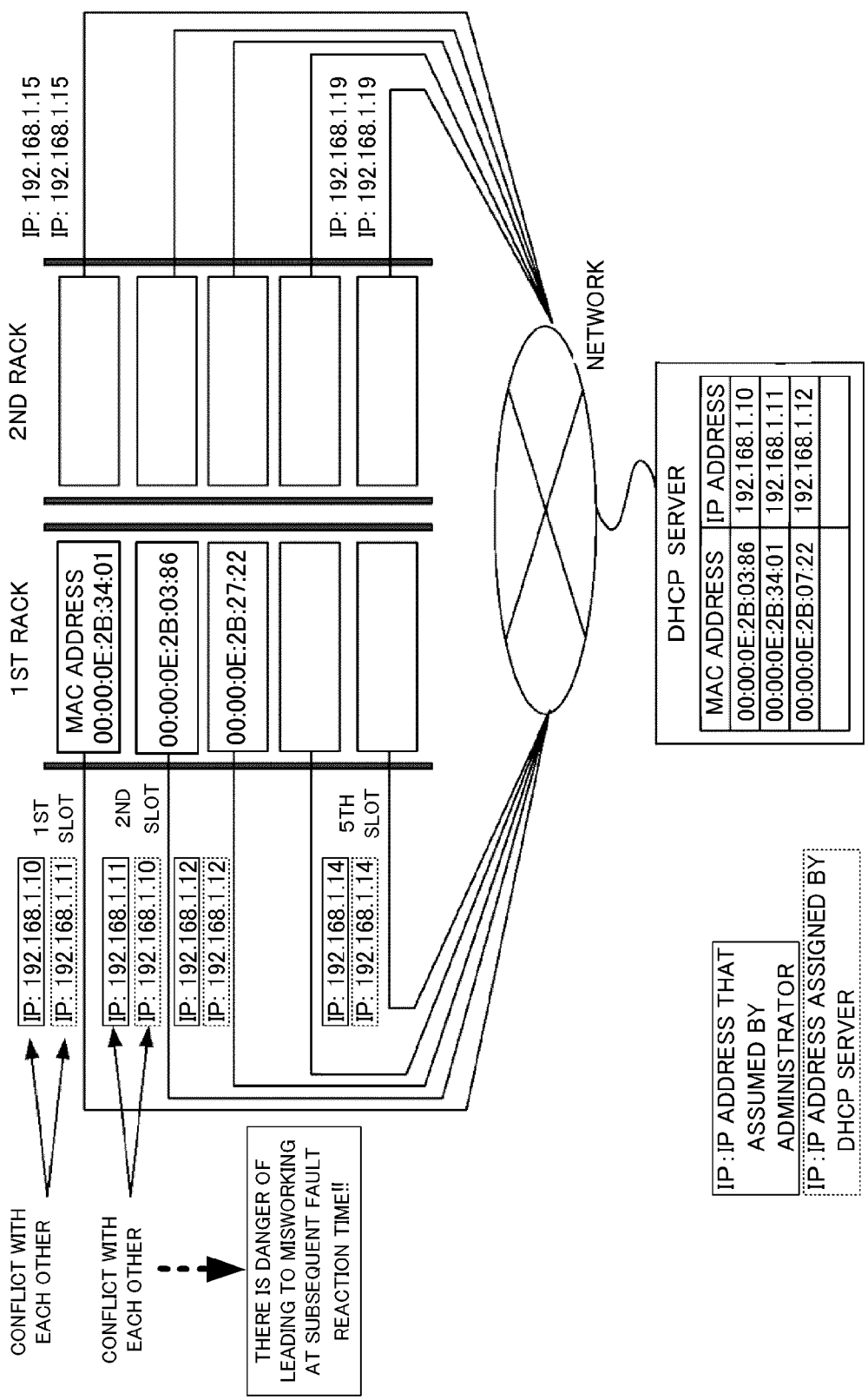

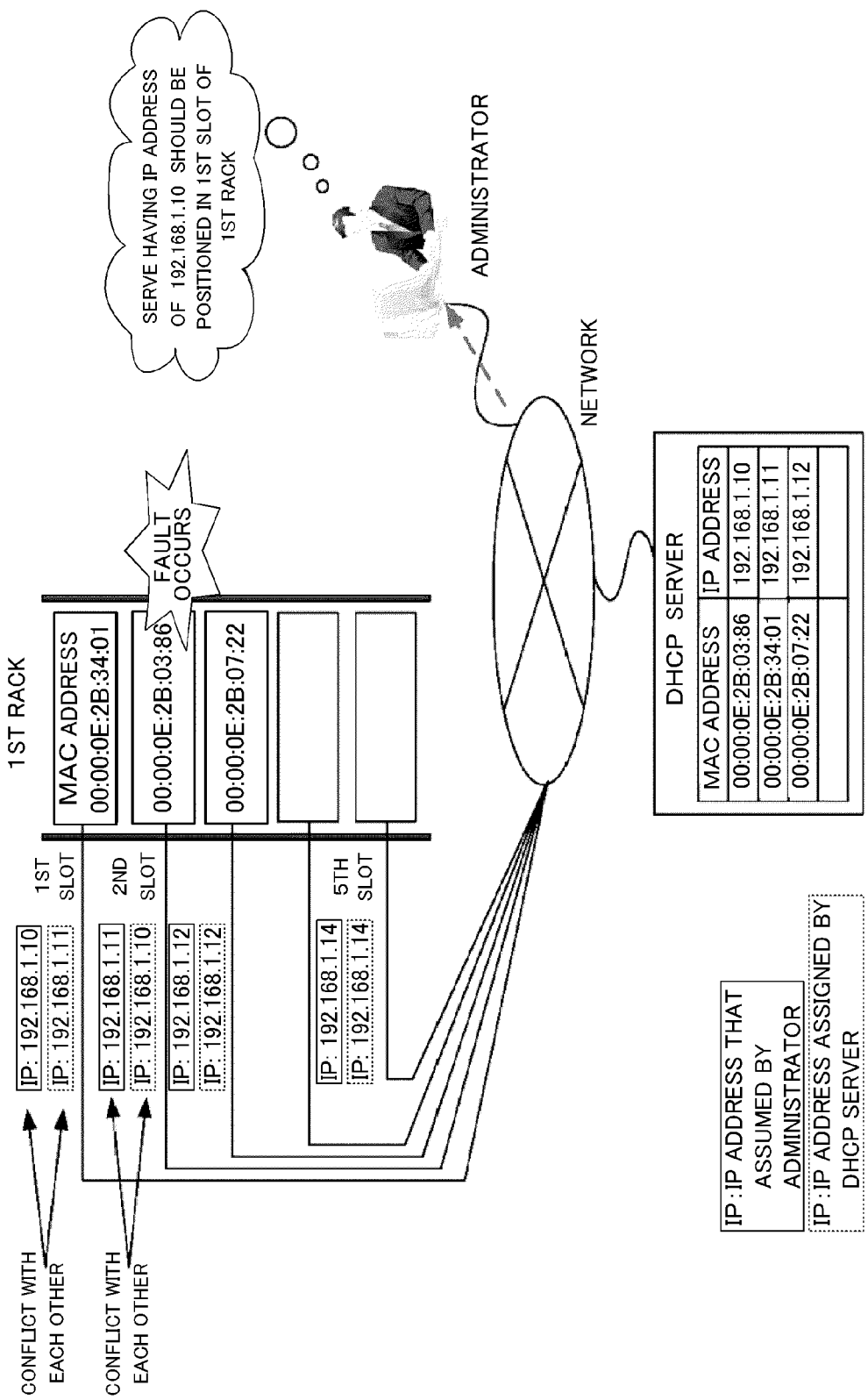

RELAY APPARATUS, RELAY PROGRAM, RELAY METHOD, AND MANAGEMENT SYSTEM FOR MANAGING DEVICES CONNECTED TO NETWORK

CROSS-REFERENCE TO RELATED APPLICATIONS

This application is a continuation application, filed under 35 U.S.C. §111(a), of PCT Application No. PCT/JP2007/056906, filed Mar. 29, 2007, the disclosure of which is herein incorporated in its entirety by reference.

FIELD

The present invention relates to a relay apparatus that manages tag information attached to a device (computer, etc.) connected to a network, an IP address of the device, and identification information assigned to the device in association with one another, its relay program, its relay method, and a management system for managing devices connected to a network.

BACKGROUND

In the field of management of devices connected to a network, a technique (DHCP) that dynamically assigns a specific IP address to a device connected to a network based on information (e.g., MAC address of a network card) unique to the device is known.

When this technique is applied to a data center where a plurality of devices (e.g., rack servers) connected to a network are consolidated in one location for efficient parallel computation or for reduction in management cost of the devices, a relationship between the MAC addresses of the network-connected devices and IP addresses assigned to the devices is managed as one-to-one relationship as illustrated in FIG. 10.

Further, there is known a blade server that includes, as a hardware, a structure for an administrator of a data center to specify and manage the installation positions of the individual network-connected devices. The blade server uses, e.g., slot numbers 1 to 10 in order to specify, e.g., a device of the second slot of the first rack as illustrated in FIG. 11. The slot numbers 1 to 10 are assigned to serial ports 801 to 810, and the MAC addresses, IP addresses, and slot numbers are managed in association with one another in an information management table 820.

As a prior art relating to the present invention, a technique that assigns a MAC address encoded with a physical position to a device (refer to, e.g., Patent Document 1).
[Patent Document 1] International Publication Pamphlet No. 2004-533139

However, the blade server illustrated in FIG. 11 has special designs on blades (individual devices connected to a network) and a base chassis (chassis for mounting a plurality of blades) 830 and, therefore, it is difficult to make common use of the blade server and a general device. That is, the network-connected general device does not have a function like that of the blade server, and, at present, a function for managing a relationship between the general device and installation position thereof has not been provided.

Thus, in the case where a data center is built using the general devices, an administrator of the data center associates the position represented by the rack number and the slot of the rack with an IP address in a one-to-one correspondence and associates the IP address with information unique to the network-connected devices (MAC address of a network card is often used) in a one-to-one correspondence.

However, as illustrated in FIG. 12, if the information unique to the network-connected device, e.g., MAC address, is changed at the replacement time, the administrator needs to remove the network card retaining the MAC address from the device to be replaced so as to attach it to a new device, or needs to modify management information of a DHCP server, causing much trouble to the administrator.

Further, as illustrated in FIG. 13, if the network-connected devices are incorrectly installed at the replacement time of a plurality of the network-connected devices, a case may occur where a different device from one that the administrator intends to replace is erroneously replaced at the subsequent replacement time.

SUMMARY

According to an aspect of the invention, a relay apparatus that relays information communication between a device connected to a network and a management apparatus for managing the network-connected device, comprising: a tag information acquisition section that acquires tag information attached to the network-connected device; a management section that manages the tag information read out by the tag information acquisition section and an IP address assigned by the management apparatus, and an identification information assigned to the relay apparatus itself in association with one another; and a processing section that receives information that the management apparatus has transmitted with the tag information or IP address as a transmission destination and receives information transmitted from the network-connected device for execution of predetermined processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a block diagram illustrating a first problem of the conventional network-connected device management method; and FIG. 13 is a block diagram illustrating a second problem of the conventional network-connected device management method.

DESCRIPTION OF EMBODIMENTS

Embodiments of the present invention will be described below with reference to the accompanying drawings.

First Embodiment

First, a configuration of a relay apparatus according to a first embodiment will be described.

Figure 1:
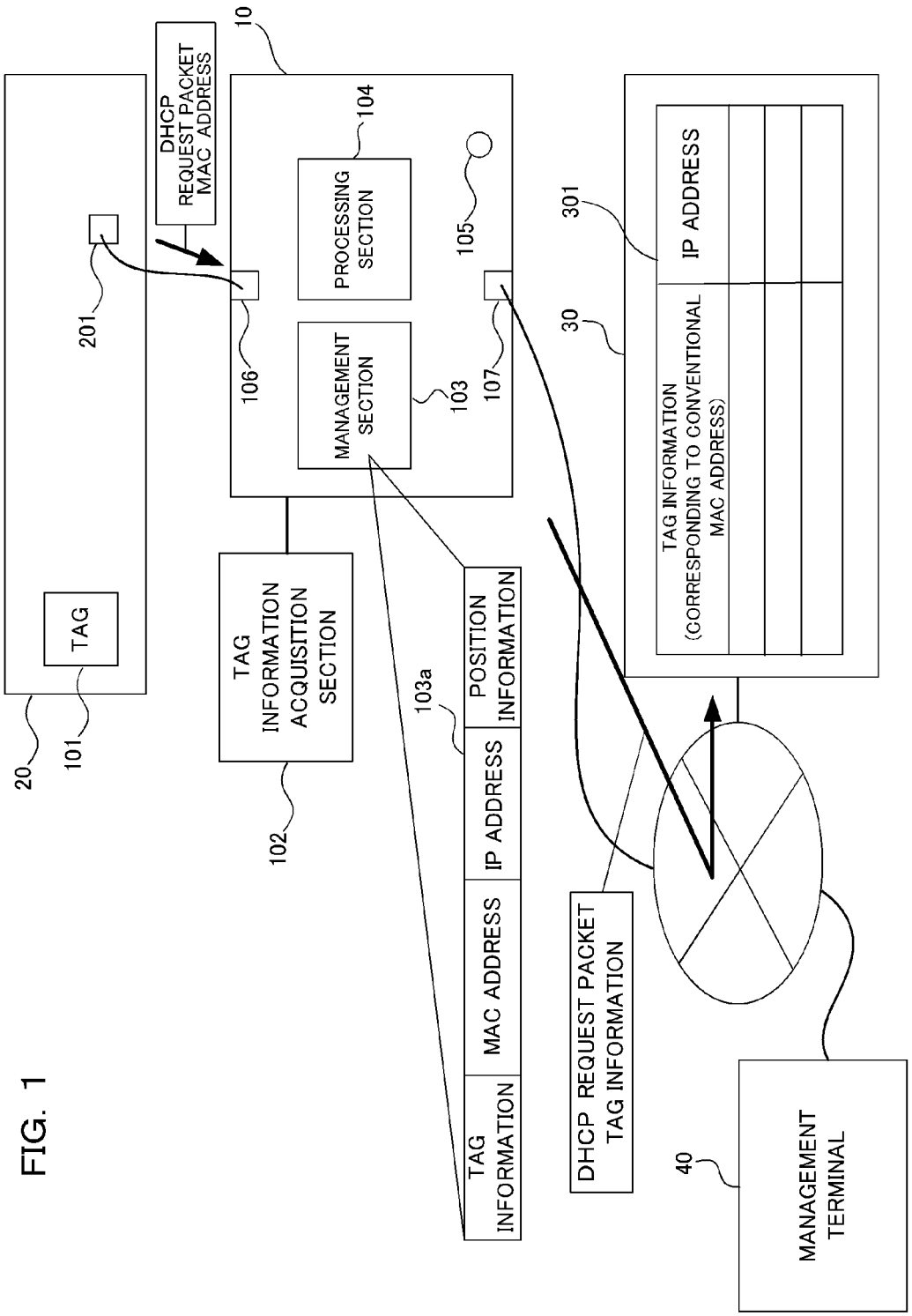
FIG. 1 is a bock diagram illustrating an example of a configuration of a relay apparatus according to a first embodiment.

FIG. 1 is a bock diagram illustrating a configuration of the relay apparatus according to the first embodiment.

A relay apparatus 10 includes a tag information acquisition section 102 that reads out and acquires information of a tag 101, a management section 103, a processing section 104, an ID lamp 105, a network port 106, and a network port 107.

A device 20 connected to a network has a network port 201 for transmitting/receiving data and retains a MAC address as identification information of the device itself. Further, the tag 101 is attached to the network-connected device 20. A management apparatus 30 has a management table 301 for managing tag information which is information of the tag 101 and an IP address in association with each other.

In the first embodiment, the network-connected device 20 is assumed to be a rack server, and the management apparatus 30 is assumed to be a DHCP server.

A management terminal 40 is connected to a plurality of the network-connected devices 20 through a network and manages them.

The tag 101 is attached to the network-connected device 20 and retains tag information that can be read out by the tag information acquisition section 102. The tag information acquisition section 102 reads out the tag information of the tag 101. The tag 101 is, e.g., a wireless IC tag, and the tag information acquisition section 102 is a read/write unit. In place of the wireless IC tag, a configuration that uses light or magnetism to read out the identification information may be used as the tag 101. In this case, the tag information may be retained as presence/absence of physical protrusions, a barcode, or electromagnetic information. The tag information may be a 48-bit numerical value like the MAC address or 16-bit numerical value in the case where a smaller bit number is sufficient. Alternatively, the tag information may be a character string having a format capable of being electrically treated by a computer. The tag information acquisition section 102 is assumed to be provided with a read unit appropriate for the information retaining method of the tag 101.

The processing section 104 of the relay apparatus 10 acquires the MAC address added to a DHCP request packet that the network-connected device 20 transmits in order to acquire an IP address, replaces the acquired MAX address by tag information, and transmits the tag information to the management apparatus 30. Further, the processing section 104 receives a position information grasping command and returns a response to the command. Further, the processing section 104 turns on or blinks the ID lamp 105 in response to a command from the management apparatus 30.

The management section 103 of the relay apparatus 10 has a management table 103a. The management table 103a manages tag information, MAC address, IP address, and position information (identification information) in association with one another.

The ID lamp 105 turns on or blinks in response to a command input through the network ports 106 and 107. The ID lamp 105 is provided merely for identification purposes, and a unit for emitting a sound, such as a buzzer, may be used in place of the ID lamp 105. Further, the ID lamp 105 need not be provided.

The network port 106 of the relay apparatus 10 is connected to the network-connected device 20 by means of a network cable, and the network port 107 of the relay apparatus 10 is connected to the management apparatus 30 through a network.

The management table 301 of the management apparatus 30 manages the tag information which is a substitute for the MAC address and IP address in association with each other. The tag information and IP address are registered by an administrator of the management apparatus 30.

Figure 2:
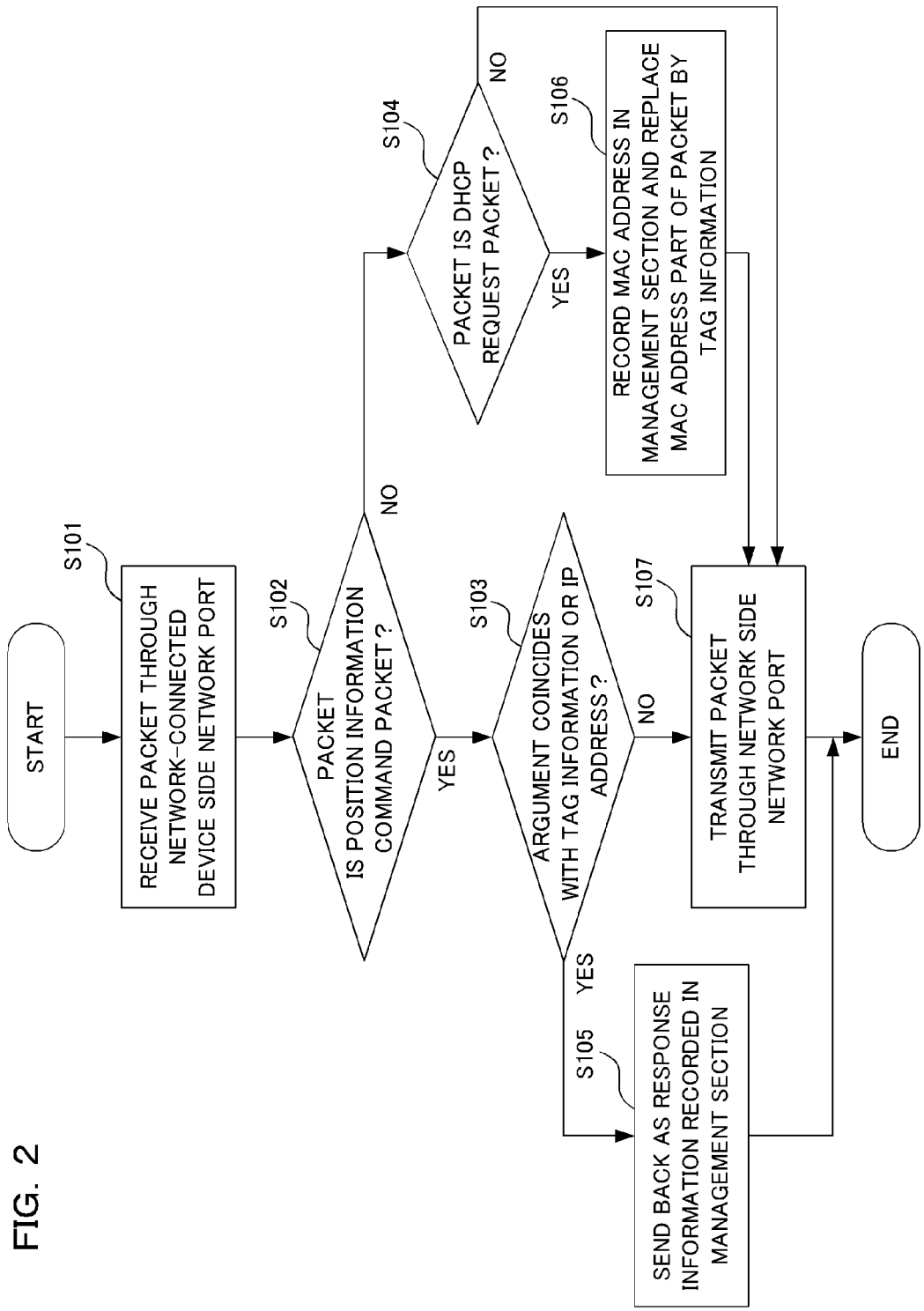
FIG. 2 is a flowchart illustrating operation of the relay apparatus according to the first embodiment in the case where the relay apparatus receives a packet through a network port on the side of a network-connected device.

FIG. 2 is a flowchart illustrating operation of the relay apparatus 10 in the case where the relay apparatus 10 receives a packet through the network port on the side of the network-connected device 20. In FIG. 2, it is assumed that the tag 101 is read out by the tag information acquisition section 102 and that the read out tag information is retained by the management table 103a of the management section 103.

The processing section 104 of the relay apparatus 10 receives a packet through the network port 106 on the side of the network-connected device 20 (S101).

The processing section 104 which has received the packet determines whether the received packet is a packet of a position information grasping command (S102).

When determining that the received packet is a packet of a position information grasping command (YES in S102), the processing section 104 determines whether an argument included in the position information grasping command packet coincides with the tag information or IP address retained by the management section 103 of the relay apparatus 10 (S103).

When determining that the argument coincides with the tag information or IP address retained by the management section 103 (YES in S103), the processing section 104 returns as a response the position information retained by the management section 103 through the network port 106 (S105).

On the other hand, when determining that the argument coincides with neither the tag information nor IP address (NO in S103), the processing section 104 transmits the packet through the network side network port 107 (S107).

When determining that the packet is not a packet of a position information grasping command (NO in S102), the processing section 104 determines whether the packet is a DHCP request packet (S104).

When determining that the packet is a DHCP request packet (YES in S104), the processing section 104 records a MAC address included in the packet in the management section 103, replaces the MAC address part of the packet by tag information (S106), and transmits the resultant packet through the network port 107 (S107).

On the other hand, when determining that the packet is not a DHCP request packet (NO in S104), the processing section 104 transmits the packet through the network port 107 (S107).

Figure 3:
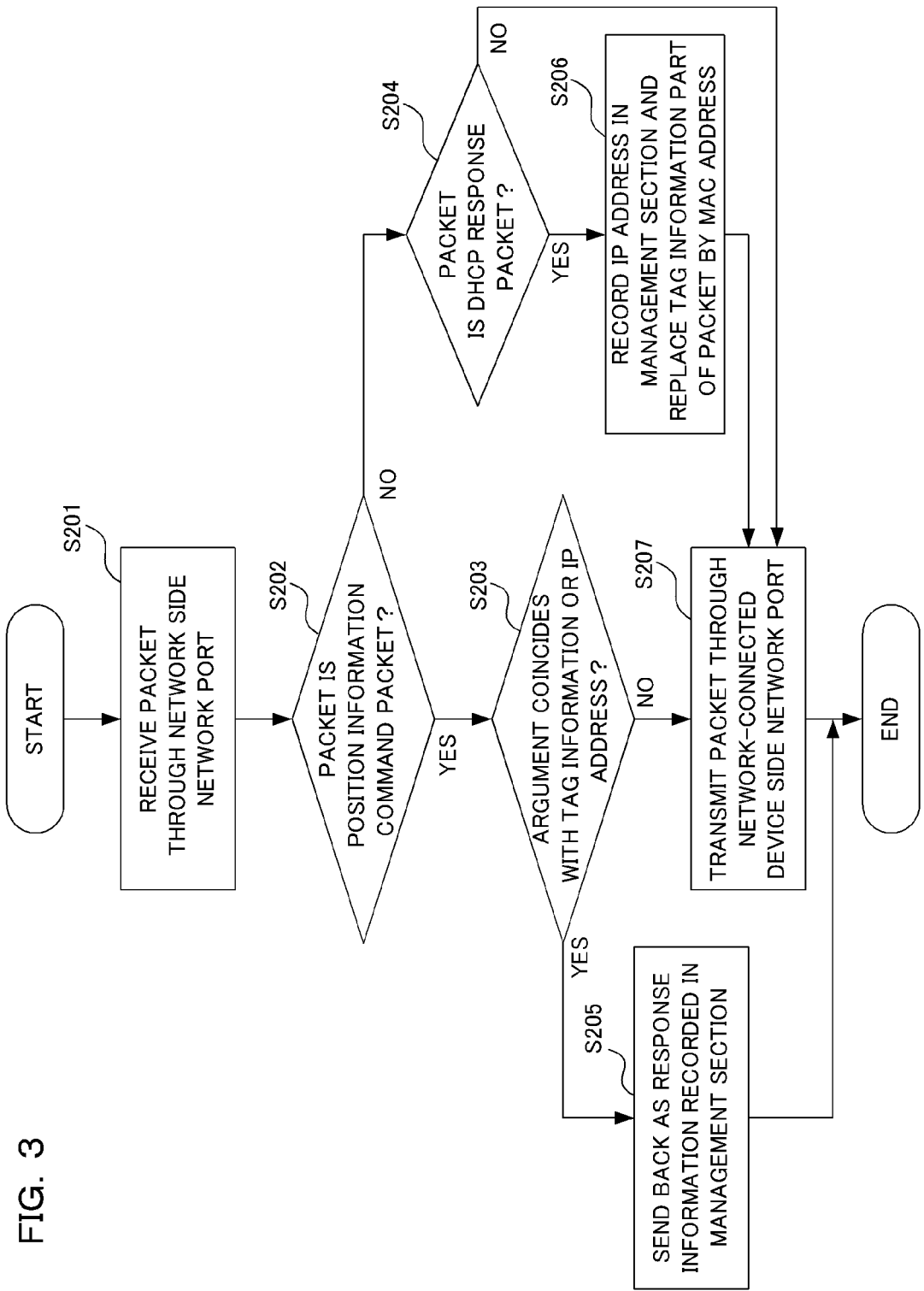
FIG. 3 is a flowchart illustrating operation of the relay apparatus according to the first embodiment in the case where the relay apparatus receives a packet through a network port on the network side.

FIG. 3 is a flowchart illustrating operation of the relay apparatus 10 in the case where the relay apparatus 10 receives a packet through the network side network port. In FIG. 3, it is assumed that the tag 101 is read out by the tag information acquisition section 102 and that the read out tag information is retained by the management table 103a of the management section 103.

The processing section 104 of the relay apparatus 10 receives a packet through the network side network port 107 (S201).

The processing section 104 which has received the packet determines whether the received packet is a packet of a position information grasping command (S202).

When determining that the received packet is a packet of a position information grasping command (YES in S202), the processing section 104 determines whether an argument included in the position information grasping command packet coincides with the tag information or IP address retained by the management section 103 of the relay apparatus 10 (S203).

When determining that the argument coincides with any of IP addresses retained by the management section 103 (YES in S203), the processing section 104 returns as a response the position information retained by the management section 103 through the network port 107 (S205).

On the other hand, when determining that the argument does not coincide with any of IP addresses (NO in S203), the processing section 104 transmits the packet through the network port 106 on the side of the network-connected device (S207).

When determining that the packet is not a packet of a position information grasping command (NO in S202), the processing section 104 determines whether the packet is a DHCP response packet (S204).

When determining that the packet is a DHCP response packet (YES in S204), the processing section 104 records an IP address included in the packet in the management section 103, replaces the tag information part of the packet by a MAC address (S206), and transmits the resultant packet through the network port 106 (S207).

On the other hand, when determining that the packet is not a DHCP response packet (NO in S204), the processing section 104 transmits the packet through the network port 106 (S207).

The processing section 104 may turn on or blink the ID lamp 105 at the timing of (YES in S103) and (YES in S203). With the turning on of the ID lamp 105 as a trigger, an administrator uses the tag information or IP address as an argument to visually confirm the installation position of the network-connected device 20. The ID lamp 105 may be, e.g., a buzzer that emits a sound.

FIGS. 4(A) to 4(D) and FIGS. 5(A) to 5(D) are views each illustrating screens displayed on the management terminal 40.

With reference to FIGS. 4(A) to 4(D), screens displayed in the case where an IP address is used as an argument to acquire the position information will be described.

Figure 4:
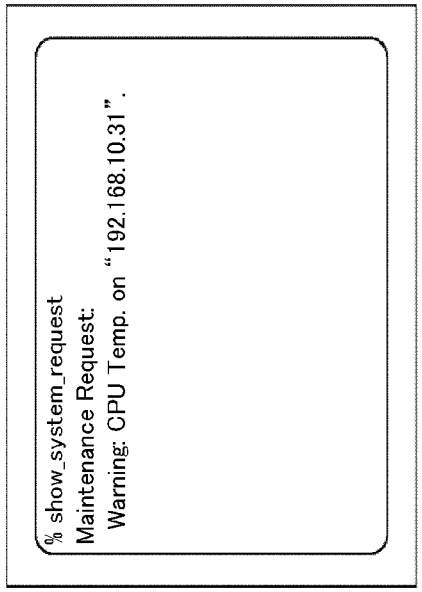
FIGS. 4(A) to 4(D) are first views each illustrating an example of screens displayed on a management terminal device according to the first embodiment.
Figure 4:
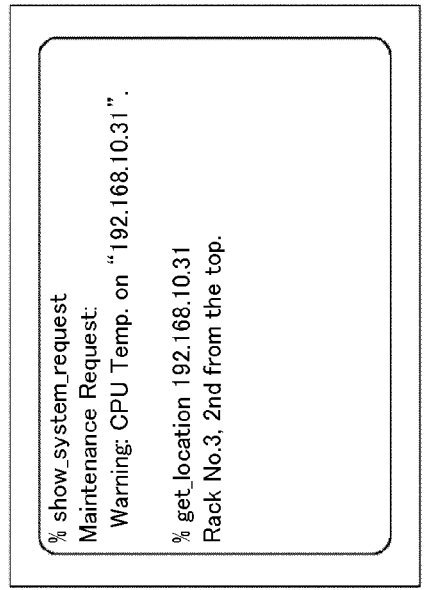
Figure 4:
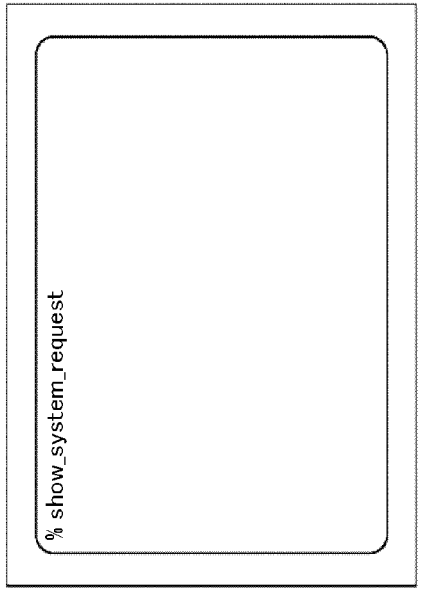
Figure 4:
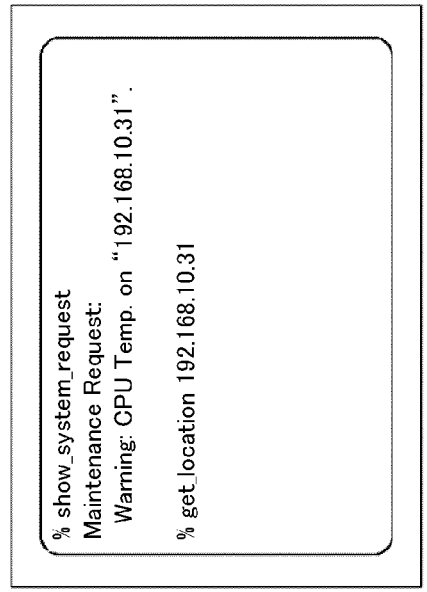

A message display command from a system is input <FIG. 4(A)>, and a message saying that maintenance is required for the network-connected device 20 having an IP address of 192.168.10.31 is displayed <FIG. 4(B)>. The IP address is used to input a command for acquiring the position information of the device 20 <FIG. 4(C)>, and the position information (second slot of third rack) of the device 20 is displayed <FIG. 4(D)>.

With reference to FIGS. 5(A) to 5(D), screens displayed in the cases where tag information is used as an argument to acquire the position information and where any network-connected device 20 is not found.

Figure 5:
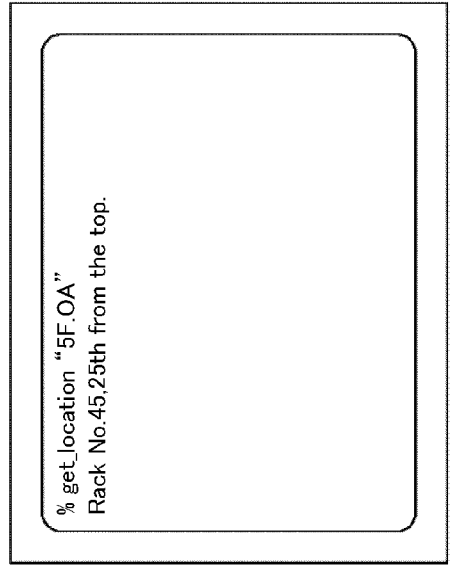
FIGS. 5(A) to 5(D) are second views each illustrating an example of screens displayed on the management terminal device according to the first embodiment.
Figure 5:
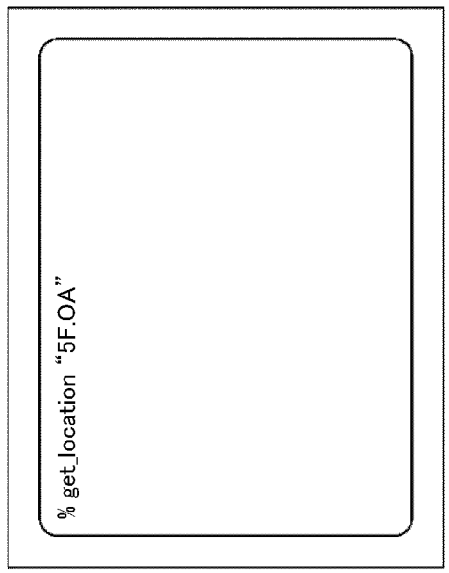
Figure 5:
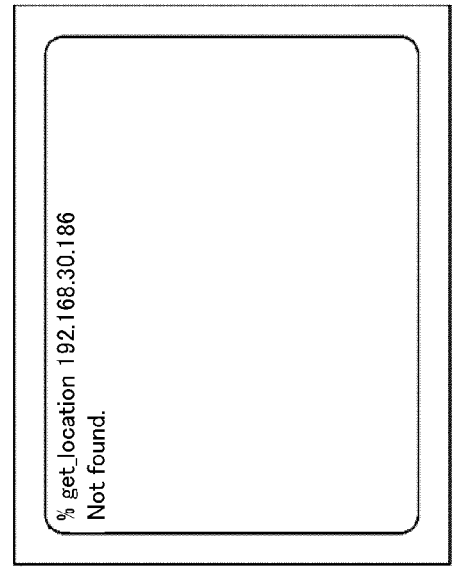
Figure 5:
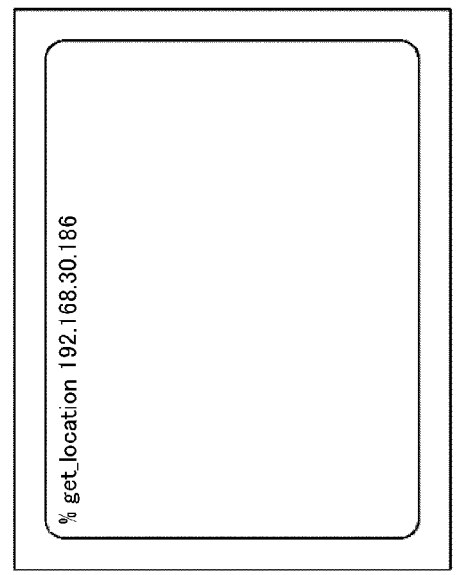

A command for inquiring about the position information is input using tag information <FIG. 5(A)>, and the position information of the device 20 is displayed <FIG. 5(B)>.

Then, a command for inquiring about the position information is input using an IP address <FIG. 5(C)>, and a message saying that any network-connected device 20 having the input IP address has not been found is displayed <FIG. 5(D)>.

Figure 6:
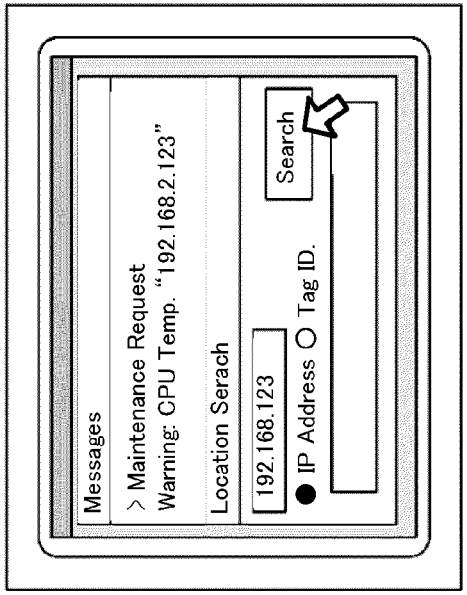
FIGS. 6(A) to 6(C) are third views each illustrating an example of screens displayed on the management terminal device according to the first embodiment.
Figure 6:
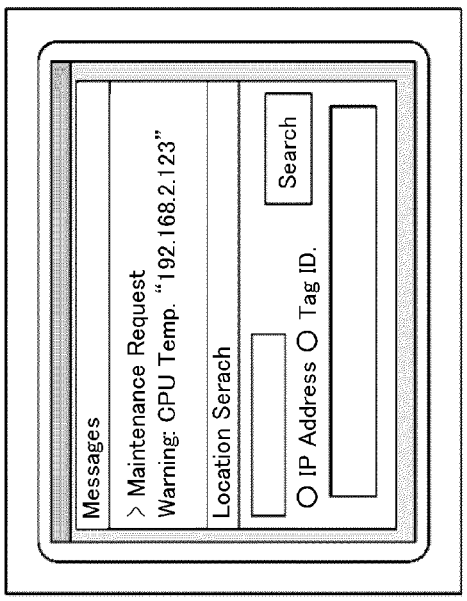
Figure 6:
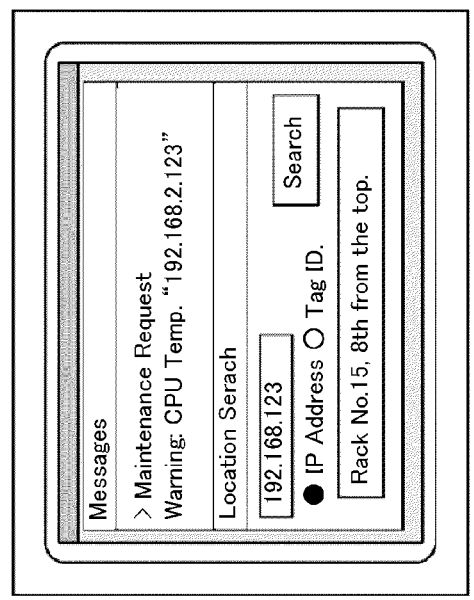

The above information may be displayed in a GUI as illustrated in FIGS. 6(A) to 6(C).

Figure 7:
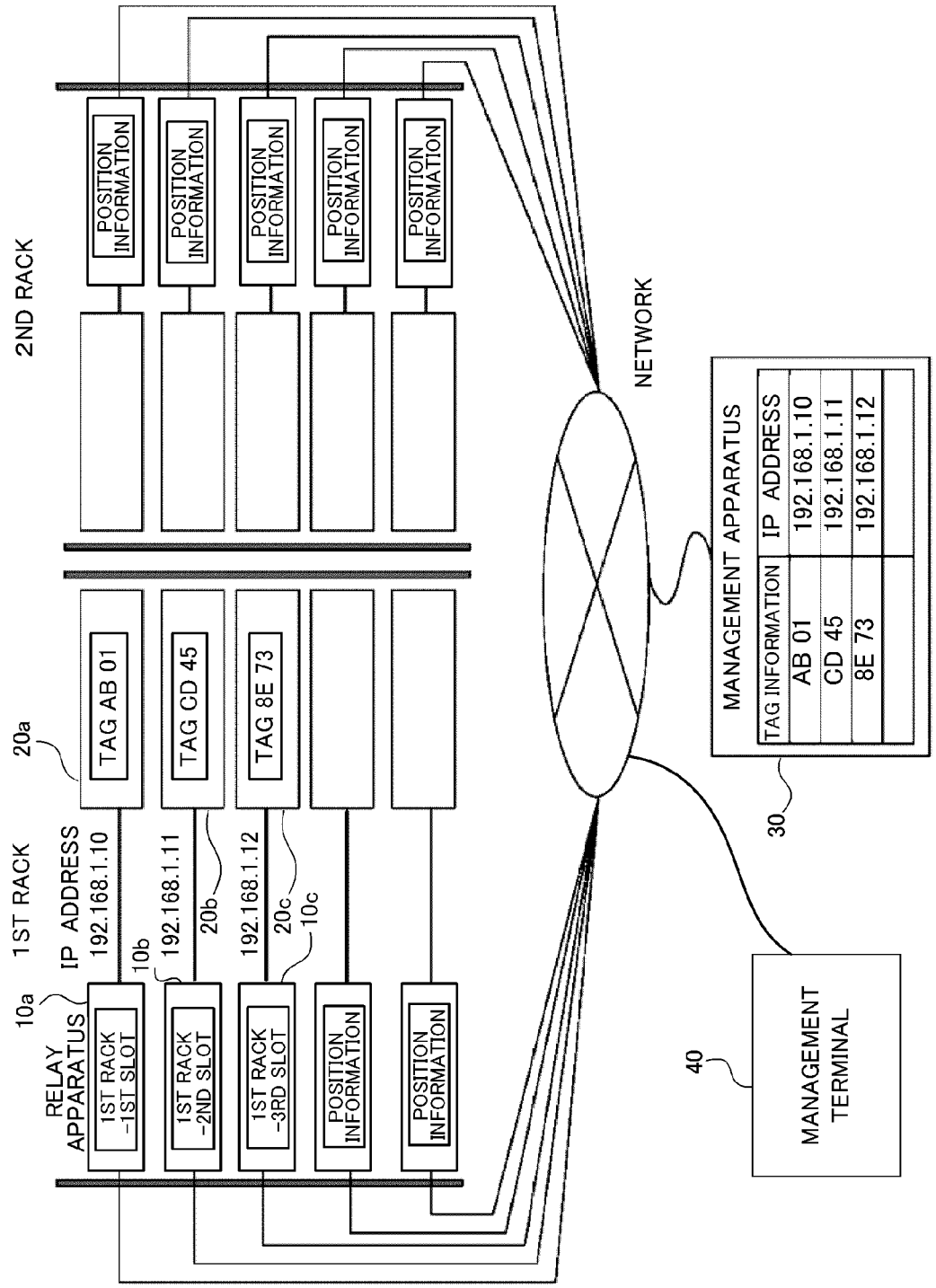
FIG. 7 is a view illustrating a first arrangement example of the relay apparatuses according to the first embodiment.
Figure 8:
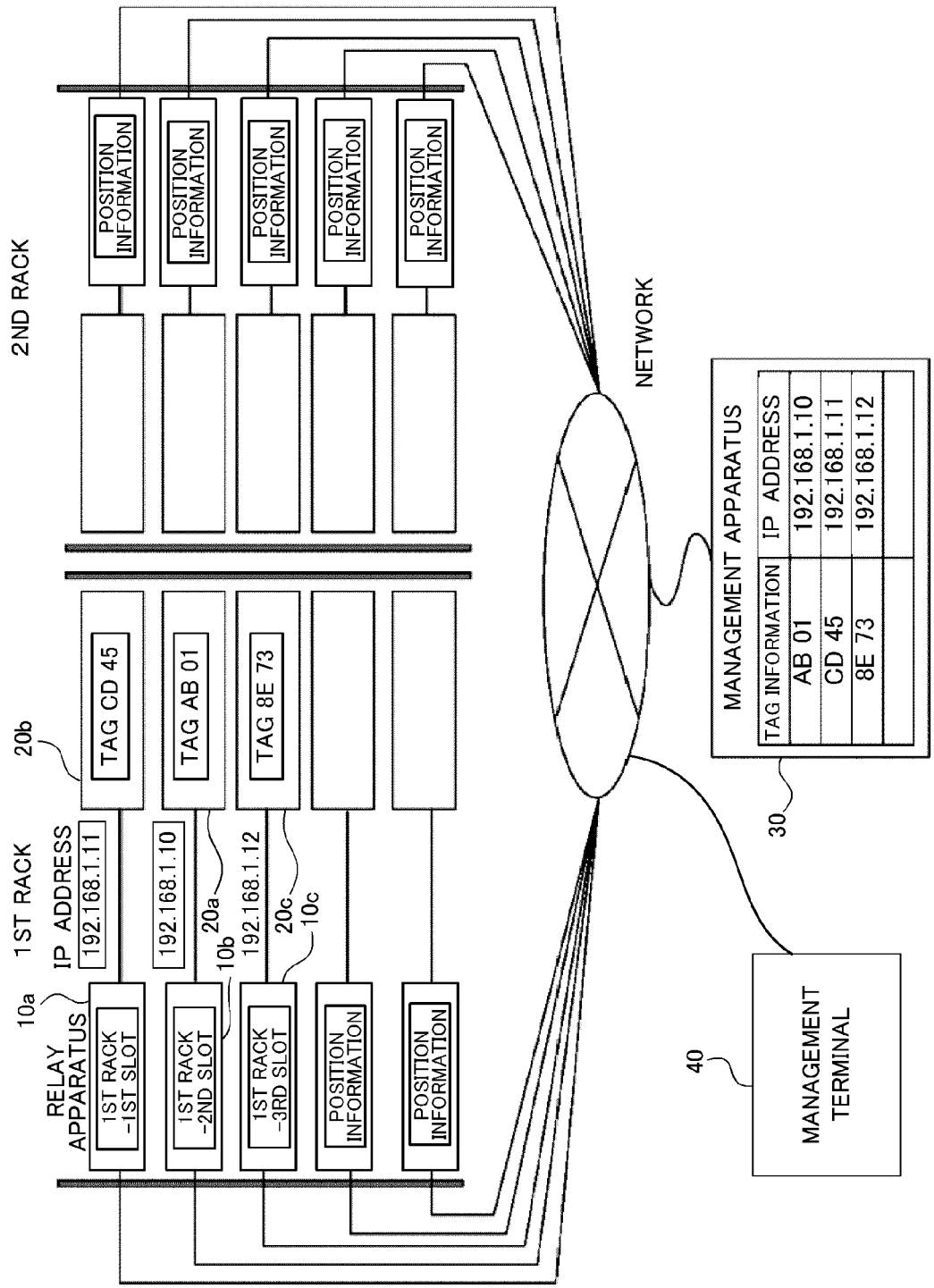
FIG. 8 is a view illustrating a second arrangement example of the relay apparatuses according to the first embodiment.

With reference to FIGS. 7 and 8, a method of grasping the positions of the network-connected devices connected to a network in which a plurality of relay apparatuses are provided will be described.

FIGS. 7 and 8 are block diagrams each illustrating an example of arrangement of the relay apparatuses according to the first embodiment. FIG. 7 illustrates a state where all the network-connected devices are positioned in predetermined positions, and FIG. 8 illustrates a state where some of the network-connected devices 20 are positioned in different positions from the predetermined positions.

In FIG. 7, the same type network-connected devices 20a, 20b, and 20c each added with a tag and each connected to the management apparatus 30 through a network are installed in a rack. Each of relay apparatuses 10a, 10b, and 10c are provided for each of the devices 20a, 20b, and 20c. The management section 103 of each of the relay apparatuses 10 (10a, 10b, and 10c) retains the position information of the corresponding device. For example, the relay apparatus 10a retains information indicating "1st rack-1st slot".

In FIG. 8, the positions of the network-connected devices 20a and 20b are switched together with their external tags 101. Since the IP address is assigned to the tag information, the IP addresses of the network-connected devices are also changed.

The arrangement illustrated in FIG. 8 differs from the arrangement intended by an administrator. However, in the case where some sort of processing is required for, e.g., the network-connected devices 20b to which an IP address of 192.168.1.11 has been assigned, the correct position of the device 20b can be grasped by acquiring the position information (1st rack-1 st slot) using the IP address or tag information as an argument.

Second Embodiment

In the first embodiment, one relay apparatus is provided for one network-connected device. In this second embodiment, a case where one relay apparatus is provided for a plurality of network-connected devices will be described.

Figure 9:
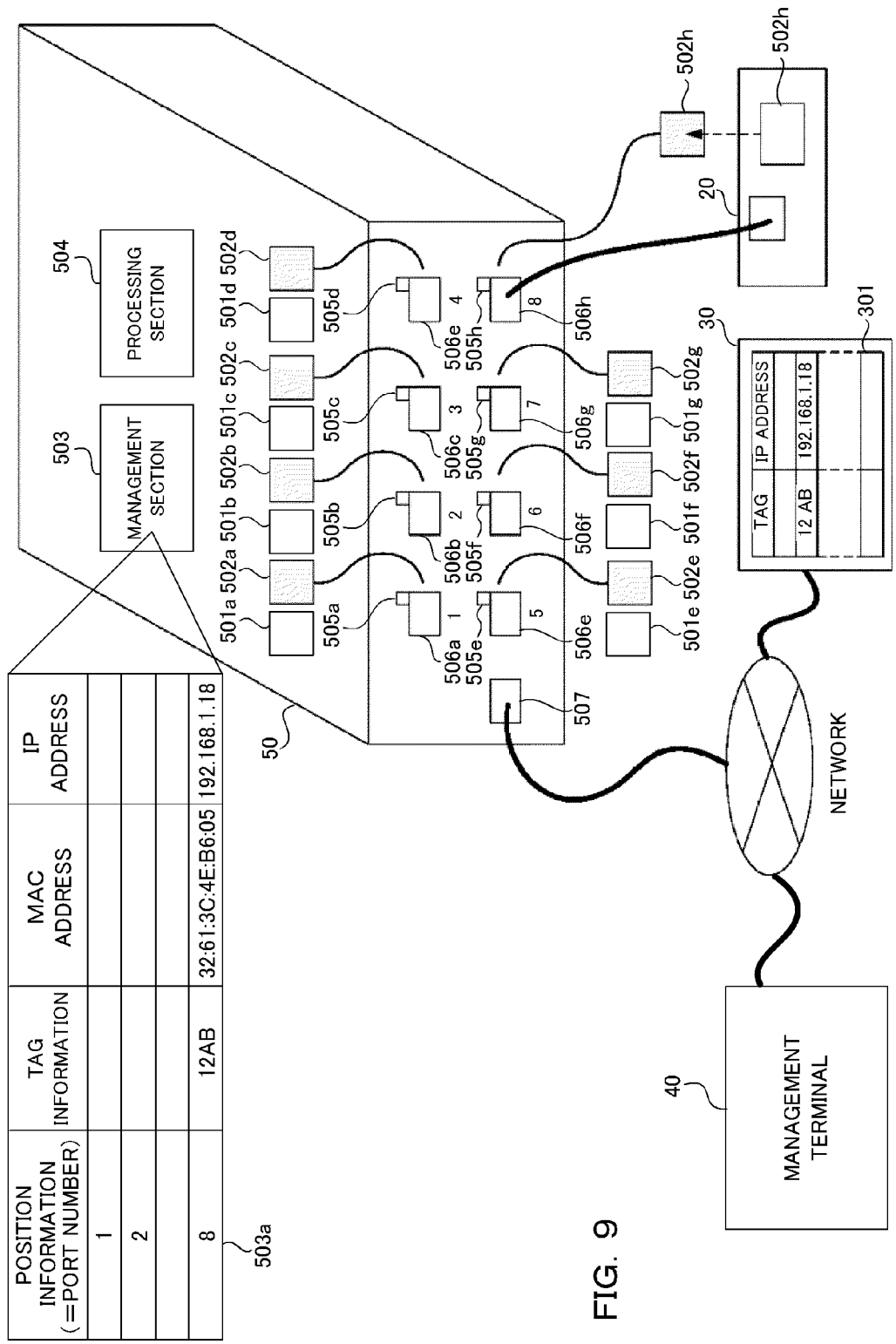
FIG. 9 is a block diagram illustrating an example of a configuration of the relay apparatus according to a second embodiment.
Figure 10:
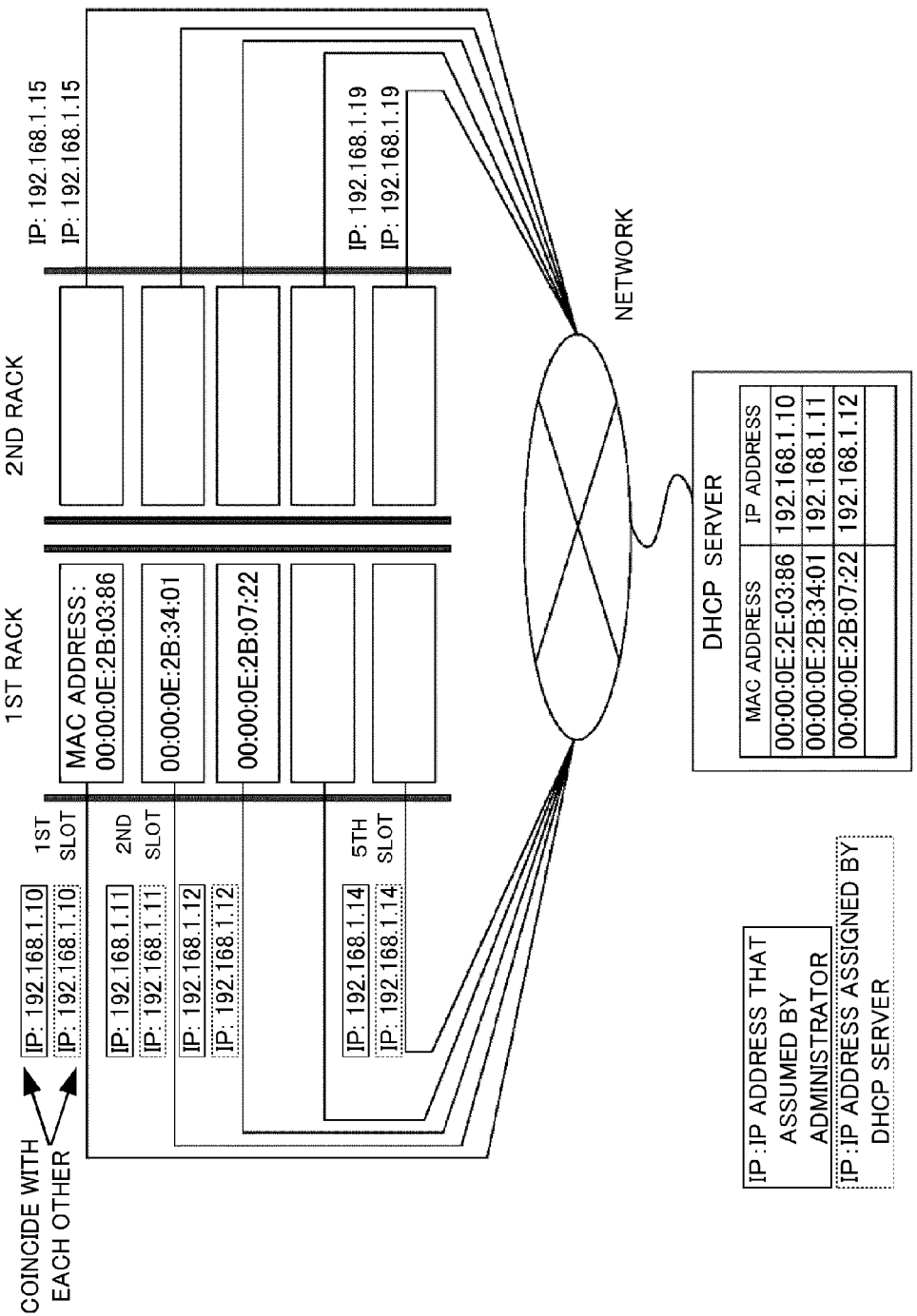
FIG. 10 is a block diagram illustrating an example of a conventional network-connected device management method.
Figure 11:
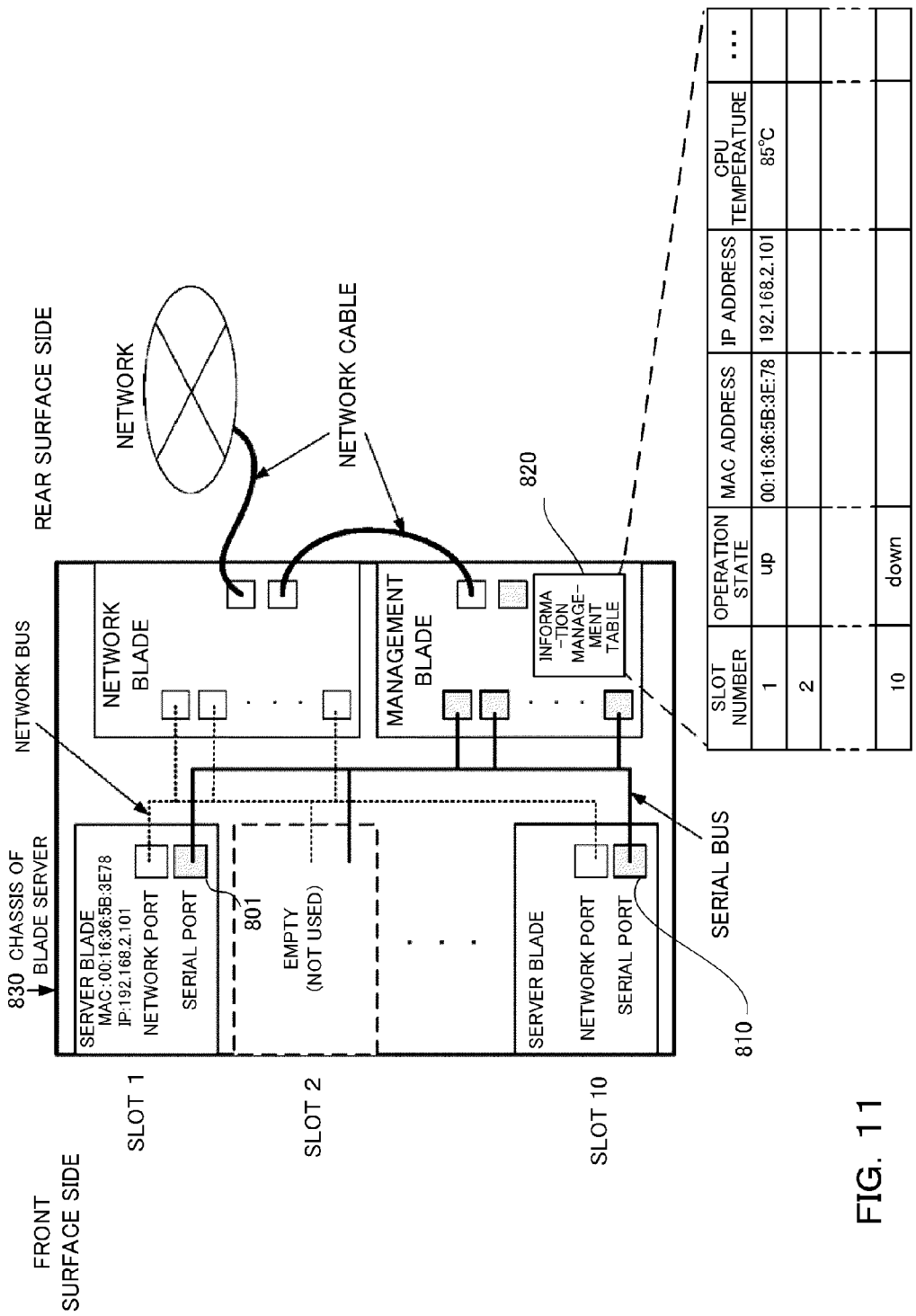
FIG. 11 is a block diagram illustrating an example of a configuration of a conventional blade server.

FIG. 9 is a configuration diagram of the second embodiment. In FIG. 9, the same reference numerals as those in FIG. 1 denote the same or corresponding parts as those in FIG. 1, and the descriptions thereof will be omitted here.

The configuration of the second embodiment differs from that of the first embodiment in that a relay apparatus 50 includes a plurality of tag information acquisition sections 502a to 502h that can read out a plurality of tags 501a to 501h, a plurality of ID lamps 505a to 505h, and network ports 506a to 506h on the side of a plurality of the network-connected devices 20, as well as has a management table 503a for managing a plurality of tag information, a plurality of IP addresses, and a plurality of position information in association with one another in the management section.

The operation of the second embodiment differs from that of the first embodiment in that a processing section 504 determines a plurality of MAC address, a plurality of IP addresses, and a plurality of tag information for execution of predetermined processing and that when sending back a response to an argument, the processing section 504 not only determines whether the argument coincides with the IP address or tag information retained by the management section 503 but also refers to the management table 503a to return, as a response, position information or port number corresponding to the argument.

As in the first embodiment, the ID lamp may be a buzzer. In this case, the buzzer may emit a different sound depending on a network port corresponding to the argument. Further, the ID lamp or buzzer need not be provided. Further, the number of the network ports on the side of the network-connected device 20 is not especially limited.

In the above description, a management step of the present invention corresponds to steps S106 and S206 in the first embodiment. A processing step of the present invention corresponds to steps S102, S103, S104, S105, S106, S202, S203, S204, S205, and S206.

As described above, according to the present invention, it is possible to manage tag information attached to a network-connected device, an IP address of the device, and identification information assigned to a relay apparatus in association with one another, making it easy to grasp the installation position of the network-connected device.

Further, it is possible to provide a program that allows a computer to execute the above operation illustrated in the flowcharts and respective steps of the embodiments as a relay program for a relay apparatus according to the present invention. By storing the above program in a computer-readable storage medium, it is possible to allow the computer to execute the program. The computer mentioned here includes a host device like a personal computer, a controller of a test device, a controller of a storage device, such as an MPU or CPU, and the like. The computer-readable medium mentioned here includes: a portable storage medium such as a CD-ROM, a flexible disk, a DVD disk, a magneto-optical disk, or an IC card; a database that holds computer program; another computer and database thereof; and a transmission medium on a network line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A relay apparatus that relays information communication between a device connected to a network and a management apparatus for managing the network-connected device, the relay apparatus comprising:
a tag information acquisition section that acquires and stores tag information attached to the network-connected device;
a management section that reads out the tag information stored by the tag information acquisition section and an IP address assigned to the network-connected device by the management apparatus, and creates a management table that manages an association among an identification information assigned to the relay apparatus and the tag information and the IP address assigned to the network-connected device; and
a processing section that receives information transmitted by the management apparatus with the tag information or IP address, wherein the relay identification information is replaced with the tag information or the IP address of the network-connected device, and the received information is transmitted.

2. The relay apparatus according to claim 1, wherein the identification information assigned to the relay apparatus itself is associated with the position at which the relay apparatus or network-connected device is positioned.

3. The relay apparatus according to claim 1, wherein when receiving the information that the management apparatus has transmitted with the tag information or IP address as the transmission destination, the processing section performs, as the predetermined processing, display of a message about the reception.

4. The relay apparatus according to claim 1, wherein the management section further manages an identifier of the network-connected device.

5. The relay apparatus according to claim 1, wherein the management section further manages an identifier of the network-connected device, and
when receiving the information that the management apparatus has transmitted with the tag information or IP address as the transmission destination, the processing section performs, as the predetermined processing, replacement of the tag information or IP address by the identifier of the network-connected device and transmission of the resultant information to the network-connected device.

6. The relay apparatus according to claim 1, wherein when receiving the information transmitted from the network-connected device and destined to the management apparatus, the processing section performs, as the predetermined processing, replacement of the identifier of the network-connected device by the tag information and transmission of the resultant information to the management apparatus.

7. The relay apparatus according to claim 1, wherein the management apparatus is a DHCP server, and
when receiving the information transmitted from the network-connected device and destined to the DHCP server, the processing section performs, as the predetermined processing, replacement of the MAC address of the network-connected device by the tag information and transmission of the resultant information to the DHCP server.

8. A management system for managing devices connected to the network, comprising: devices connected to a network; a management apparatus for managing the network-connected devices; and a relay apparatus that relays information communication between the network-connected devices and the management apparatus wherein,
the relay apparatus comprising:
a tag information acquisition section that acquires and stores tag information attached to the network-connected device;
a management section that reads out the tag information stored by the tag information acquisition section and an IP address assigned to the network-connected device by the management apparatus, and creates a management table that manages an association among an identification information assigned to the relay apparatus, and the tag information and the IP address assigned to the network-connected device; and a processing section that performs, when receiving information transmitted by the management apparatus with the tag information or IP address, processing based on the content of the information; and replaces, when receiving information transmitted from the network-connected device and destined to the management apparatus, an identifier of the network-connected device by the tag information or the IP address and transmits the resultant information to the management apparatus.

9. A non-transitory computer-readable memory having recorded thereon a relay program for allowing a computer constituting a relay apparatus to relay information communication between a device connected to a network and a management apparatus for managing the network-connected device, the relay program allowing the computer to execute a process comprising:

acquiring and storing tag information attached to the network-connected device;

reading out the tag information stored in the acquiring and an IP address assigned to the network-connected device by the management apparatus, and creating a management table that manages an association among an identification information assigned to the relay apparatus, and the tag information and the IP address assigned to the network-connected device;

receiving information transmitted by the management apparatus with the tag information or IP address, wherein the relay identification is replaced with the tag information or the IP address of the network-connected device; and executing predetermined processing based on the information.

10. The non-transitory computer-readable memory according to claim 9, wherein the identification information assigned to the relay apparatus is associated with the position at which the relay apparatus or network-connected device is positioned.

11. The non-transitory computer-readable memory according to claim 9, wherein when the information is received, the executing, as the predetermined processing, displays a message about the reception.

12. The non-transitory computer-readable memory according to claim 9, wherein the managing further manages an identifier of the network-connected device.

13. The non-transitory computer-readable memory according to claim 9, wherein the managing further manages an identifier of the network-connected device, and when the information is received, the executing, as the predetermined processing, replaces the tag information or IP address by the identifier of the network-connected device and transmission of the resultant information to the network-connected device.

14. The non-transitory computer-readable memory according to claim 9, wherein the management apparatus is a DHCP server, and when the information is received, the executing, as the predetermined processing, replaces the MAC address of the network-connected device by the tag information and transmission of the resultant information to the DHCP server.

15. A relay method for relaying information communication between a device connected to a network and a management apparatus for managing the network-connected device, comprising:

acquiring and storing tag information attached to the network-connected device;

reading out the tag information stored in the acquiring and an IP address assigned to the network-connected device by the management apparatus, and creating a management table that manages an association among an identification information assigned to the relay apparatus, and the tag information and the IP address assigned to the network-connected device;

receiving information transmitted by the management apparatus with the tag information or IP address, wherein the relay identification information is replaced with the tag information or the IP address of the network-connected device; and executing predetermined processing based on the information.

16. The relay method according to claim 15, wherein the identification information assigned to the relay apparatus is associated with the position at which the relay apparatus or network-connected device is positioned.

17. The relay method according to claim 15, wherein when the information is received, the executing, as the predetermined processing, displays a message about the reception.

18. The relay method according to claim 15, wherein the managing further manages an identifier of the network-connected device, and when the information is received, the executing, as the predetermined processing, replaces the tag information or IP address by the identifier of the network-connected device and transmission of the resultant information to the network-connected device.

* * * * *